Aug. 11, 1942.  M. M. HENNESSY  2,292,938
CONDUIT MEASURING DEVICE
Filed Nov. 6, 1939  4 Sheets-Sheet 1
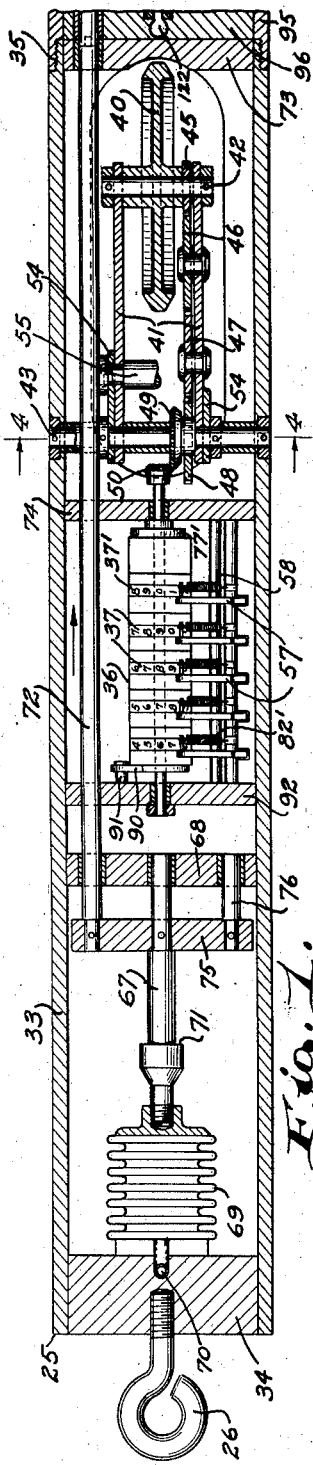
INVENTOR
M. M. Hennessy
BY
Morsell, Lieber & Morsell
ATTORNEYS.

Aug. 11, 1942.   M. M. HENNESSY   2,292,938
CONDUIT MEASURING DEVICE
Filed Nov. 6, 1939   4 Sheets-Sheet 2
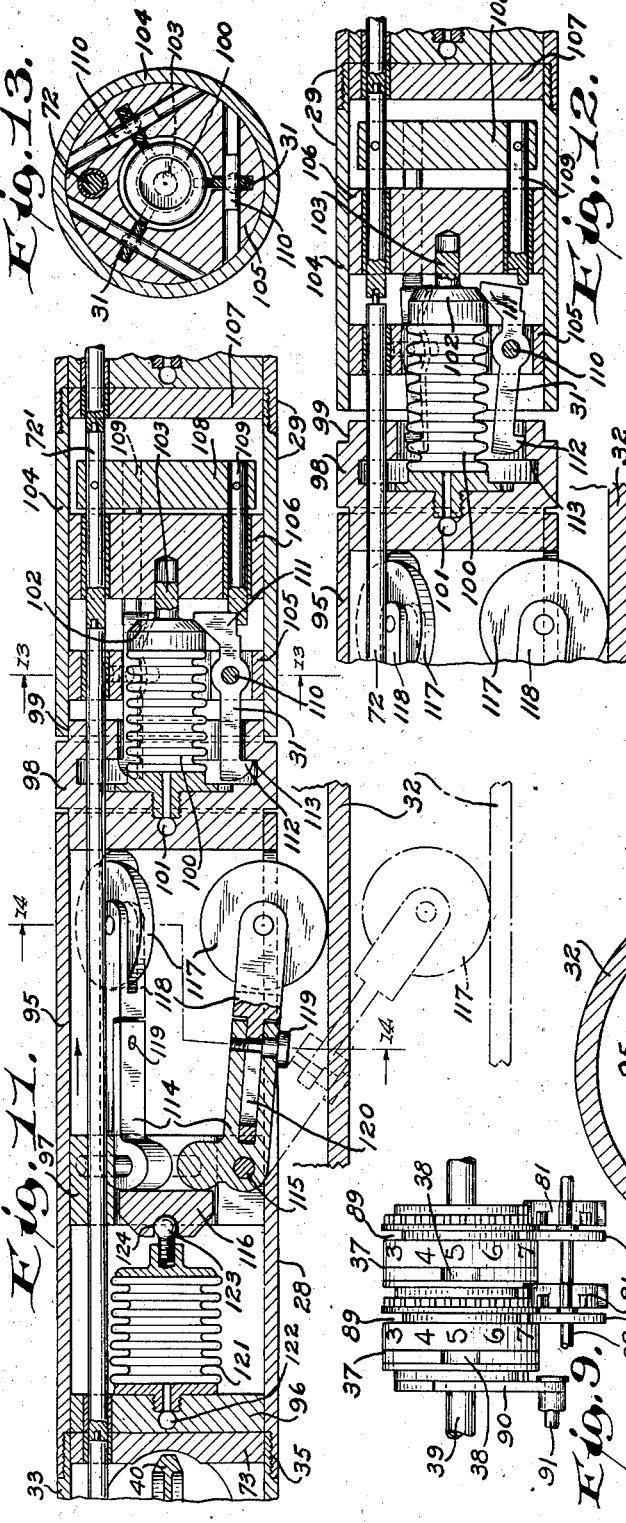
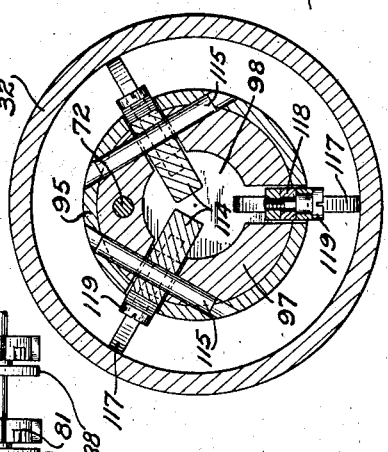
INVENTOR
M. M. Hennessy
BY
Morsell, Lieber & Morsell
ATTORNEY Aug. 11, 1942.  M. M. HENNESSY  2,292,938
CONDUIT MEASURING DEVICE
Filed Nov. 6, 1939  4 Sheets-Sheet 3
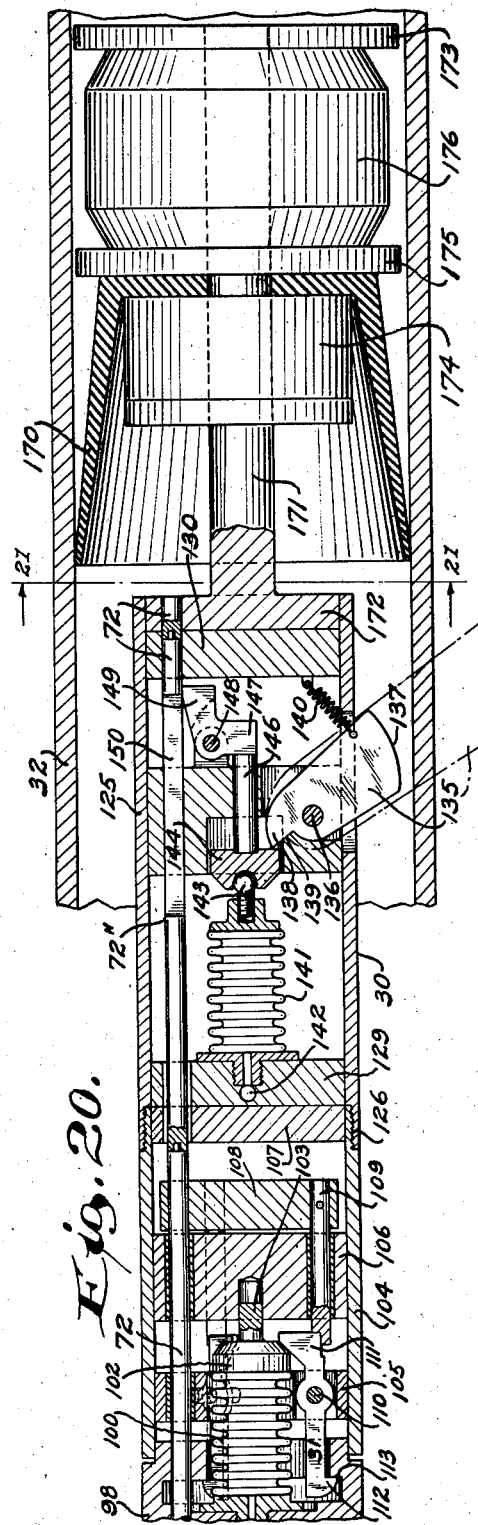
INVENTOR
M. M. Hennessy
BY
Morsell, Lieber & Morsell
ATTORNEY

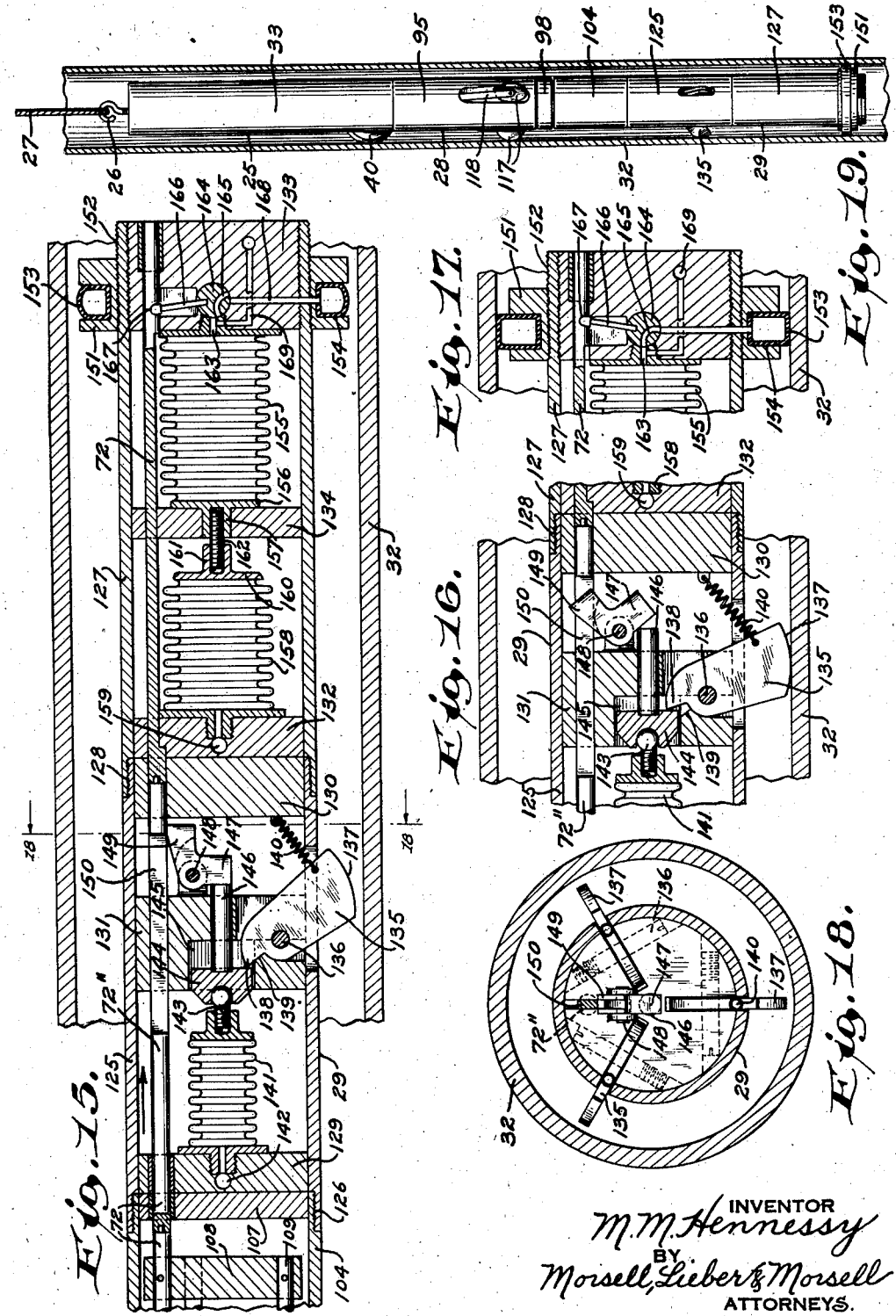

Patented Aug. 11, 1942

2,292,938

UNITED STATES PATENT OFFICE 2,292,938

CONDUIT MEASURING DEVICE

Mark M. Hennessy, Milwaukee, Wis., assignor to Durant Manufacturing Co., Milwaukee, Wis., a corporation of Wisconsin Application November 6, 1939, Serial No. 303,085

16 Claims. (Cl. 255—1)

The present invention relates in general to improvements in the art of measuring the length or depth of conduits and of performing some operation at a relatively inaccessible predetermined location within a conduit or bore, and relates more specifically to improvements in the construction and operation of devices for measuring the depth of pipes and for positioning plugs, or the like at predetermined depths within such conduits.

Generally defined, an object of my invention is to provide improved means for conveniently, quickly and accurately determining or finding a predetermined location within a conduit such as a pipe line or well casing, and for positioning an element such as a plug at the predetermined location.

It is frequently desirable in well drilling, and especially in the oil well industry, to accurately measure the lineal depth of a well, or to place an insert such as a plug at some predetermined depth within a well, or to run a survey instrument or perforating device to some definite depth. Various types of apparatus for effecting such depth measurement, surveying and plug positioning, have heretofore been proposed and used, but all of these prior devices have proven more or less objectionable because they either lacked necessary accuracy, or they were too cumbersome and complicated, thus introducing difficulties in operation, or they could not be readily utilized to perform the various functions required in the industry from such apparatus. In some of the prior depth predetermining measuring devices, the indicating apparatus was associated with a travelling cable outside of the well casing, and the slippage between the cable and the indicator due to operation at high speed or stretching of the cable or wire necessarily resulted in inaccuracy. In others, the successive casing sections were relied upon to give the depth indication, and unless the casing sections were all of exactly the same length, the results were inaccurate. The prior depth measuring and plugging devices therefore are not entirely satisfactory in commercial use, and are not sufficiently flexible in operation to meet various requirements and conditions.

It is therefore a more specific object of this invention to provide a simple and extremely flexible device for either measuring the depth of a well casing, or for accurately determining locations or conditions at various depths, or for performing operations such as plugging or perforating at predetermined depths.

Another specific object of my invention is to provide a new and useful implement which may be utilized to accurately measure the lineal depth of a well, and which is bodily insertible in and effectively cooperable with casings of various diameters.

A further specific object of the invention is to provide an improved unit comprising several sections, one or more of which may be introduced within a well casing or the like for the purpose of performing various operations, and at least one of which is adapted to be permanently fixed at a definite depth within the well casing while permitting removal of the others.

Still another specific object of this invention is to provide an improved depth indicator which can be quickly adjusted to either measure any desired lineal depth, or to stop when any predetermined depth has been reached during descent of the indicator, and which can also be removed from the conduit without disturbing the depth indication or reading.

An additional specific object of my invention is to provide an improved plug positioning device for oil, gas and water wells, the plug portion of which remains in the well while position locating portion does not remain in the well but may be withdrawn and subsequently utilized for similar and other purposes.

The above as well as other specific objects and advantages of my invention will be apparent from the following detailed description.

A clear conception of the several features constituting my present improvement, and of the mode of constructing and of utilizing well measuring and plugging devices built in acordance with the invention, may be had by referring to the drawings accompanying and forming a part of this specification wherein like reference characters designate the same or similar parts in the various views.

Fig. 1 is a central longitudinal cross-section through the indicating section alone of one of my improved depth measuring and plug positioning units;

Fig. 2 is a similar cross-section through the indicating section of Fig. 1, taken at right angles to the plane of Fig. 1 and showing the device cooperable with well casings of several diameters, the counter and latch mechanisms being in active or latching position;

Fig. 3 is a fragment of a cross-section similar to that of Fig. 2, but showing the counter and latch mechanisms in inactive or released position;

Fig. 4 is a transverse cross-section through the indicating section of Fig. 1, taken along the line 4—4;

Fig. 5 is a somewhat enlarged transverse cross-section through the counter and latch portion of Figs. 1, 2, and 3, showing the latch and counter in active position;

Fig. 6 is a similarly enlarged transverse cross-section similar to that of Fig. 5, but showing the latch released;

Fig. 7 is another similarly enlarged transverse cross-section through the resetting end of the counter mechanism, showing the resetting pawl in active position;

Fig. 8 is a transverse cross-section similar to that of Fig. 7 with the resetting pawl withdrawn to permit free rotation of the counter wheels;

Fig. 9 is an enlarged side elevation of one of the counter units or wheels;

Fig. 10 is a similarly enlarged end view of one of the counter units or wheels showing the reversal preventing pawl;

Fig. 11 is a central longitudinal cross-section through the guiding section alone of one of my improved devices, showing the plug section attaching hooks in active position;

Fig. 12 is a fragment of a section like that of Fig. 11, but showing the attaching hooks released and the adjacent end of the plug section partly withdrawn;

Fig. 13 is a transverse cross-section through the guide section of Fig. 11, taken along the line 13—13;

Fig. 14 is another transverse cross-section through the assemblage of Fig. 11, taken along the line 14—14;

Fig. 15 is a central longitudinal cross-section through one type of plug section adapted to automatically lock itself in position, and showing the expansible locking ring contracted, and the locking cams inactive;

Fig. 16 is a fragment of a cross-section similar to that of Fig. 15, showing the locking cams in active position;

Fig. 17 is another fragment of the cross-section shown in Fig. 15, but showing the locking and sealing ring in action;

Fig. 18 is a transverse cross-section through the assemblage of Fig. 15, taken along the line 18—18;

Fig. 19 is a central longitudinal cross-section through a fragment of a well casing, showing one of the improved measuring and plugging assemblages disposed therein;

Fig. 20 is a central longitudinal cross-section through another type of plug section having an ordinary cup-shaped rubber seal ring; and Fig. 21 is a transverse section through the modified plug of Fig. 20, taken along the line 21—21.

While my improvement has been shown and described herein as being especially applicable for the purpose of measuring the lineal depth of wells and for inserting plugs at predetermined locations within a well or the like, it is not the intent to thereby unnecessarily restrict the scope or utility of the invention. It is also to be noted that the present disclosure is more or less diagrammatic, and that the fluid pressure actuated bellows used for automatically tripping certain mechanisms may be replaced by helical compression springs or the like, functioning in a similar manner.

The improved conduit length or depth measuring and plug locating device in its entirety, comprises in general an indicating section 25 having an eye-bolt 26 to which a suspension rope or cable 27 may be attached; a guiding section 28 detachably secured in any convenient manner, to the end of the section 25 remote from the eye-bolt 26; and a plugging section 29 of the type shown in Fig. 15, or a plugging section 30 of the type shown in Fig. 20, adapted to be detachably secured to a guide section 28 by means of automatically releasable hooks 31. The complete assemblage and the manner in which it cooperates with a vertical conduit or well casing 32, is shown in Fig. 19, and it is to be understood that the several sections 25, 28, 29, 30 may be used for diverse purposes, either singly or combined.

Referring especially to Figs. 1 to 8 inclusive, the improved lineal measuring and indicating section 25 disclosed therein, comprises in general a tubular elongated casing 33 having a closure plug 34 at one end to which the eye-bolt 26 may be attached, and having screw threads 35 or other means of attachment at its opposite end cooperable with the section 28; a counter 36 removably confined within the medial portion of the casing 33 and having a series of numeral wheels 37 each of which has a corresponding notch 38 in a peripheral portion thereof, the counter 36 being rotatable upon a supporting shaft 39 for the wheels 37; a counter driving roller 40 journalled for rotation in the swinging ends of spaced plates 41 by means of a shaft 42, and being engageable with the inner surface of a casing 32, the plates 41 being swingably suspended from a pivot shaft 43 and having arcuate slots 44 therein; a train of gears 45, 46, 47, 48, 49, 50 connecting the roller 40 with the unit wheel 37' of the counter 36 so as to drive the counter wheels 37 whenever the roller 40 is rotating in one direction; a bellows 51 mounted within the casing 33 and being expansible by compressed elastic fluid admitted thereto through a filling duct 52, the movable end of the bellows 51 being attached by a pivot pin 53 to the corresponding ends of simultaneously swingable levers 54 the medial portions of which are fulcrumed on the shaft 43 and the opposite ends whereof cooperate with the slots 44 through adjustable screws 55 and lock nuts 56; a series of pawls 57 swingably suspended within the casing 33 by a shaft 58 and having ends 59 cooperable with the number wheel notches 38, the pawls 57 also being provided with hook portions 60; a release lever 61 having its swinging portion engageable by the hook portions 60 when one or more of the ends 59 are disengaged from the corresponding notches 38, the lever 61 being swingable upon a pivot shaft 62 and having a latch retaining cam 63 movable thereby; a latch 64 swingable upon a pin 65 and having an abutment 66 normally held in latching position by the cam 63; a central rod 67 slidable in a fixed partition 68 longitudinally within the casing 33 by means of another bellows 69 expansible by compressed elastic fluid admitted thereto through a filling duct 70, the rod 67 having an abutment 71 formed integral therewith and engageable with the latch 64; and an elongated member or rod 72 slidable in the fixed partition 68 and in other fixed partitions 73, 74, and having its end rigidly connected to the latch rod 67 by a cross-head 75 which is additionally guided by a pin 76.

The indicating counter 36 in cases when the device is used merely to measure lineal length or depth of a pipe 32, may be of the well known addition or totalizing type; but when the improved apparatus is employed for the purpose of accurately determining definite locations in a conduit at which the device or a portion thereof is to be stopped and locked, it is preferable to utilize a specially constructed subtraction counter 36 of the type shown more or less diagrammatically herein. In either case, the counter 36 should be provided with a one-way clutch interposed between the drive shaft 39 and the counter wheels 37, and as shown in Fig. 10, I have provided a clutch comprising a disk 77' rigidly attached to the counter driving shaft 39 and carrying a pawl 77 which coacts with a ratchet wheel 78 rigidly attached to the unit number wheel 37' of the counter 36. With such an assemblage of elements, when the counter 36 is being driven by the roller 40 riding along the interior of the pipe 32 in one direction, the numerals on the wheels 37 will gradually approach zero position, but if the roller 40 advances in the opposite direction, the counter wheels 37 will not move and the reading will be unaffected. In order to insure positive driving of the counter 36 when the roller 40 is rotating in the direction indicated in Fig. 2, the roller 40 is constantly urged toward and in contact with the inner surface of the pipe 32 by fluid under pressure injected into the bellows 51; and when the device is used in conduits 32 having larger diameter as shown in dot-and-dash lines in Fig. 2, the adjusting screw 55 should be positioned near the inner ends of the slots 44 and locked therein by means of the nut 56. The roller 40 is swingable about the shaft 43 through an opening in the side of the casing 33, and in order to permit access to the counter 36 for inspection, setting or removal, the casing 33 may be provided with another opening normally closed by a cover plate 79 held in position by a thumb screw 80, see Figs. 5, 6, 7 and 8.

The details of construction of the improved subtraction counter 36, form the subject matter of Pat. No. 2,235,633 granted Mar. 18, 1941, but in order to clearly portray the operation of the improved apparatus it will be necessary to at least partially describe the counter structure. The numeral wheels 37 of the counter 36 are rotatable upon and independently of the shaft 39, and are of progressively higher order beginning with the unit number wheel 37'. The successive adjacent wheels 37 are drivingly interconnected by means of pinions 81 rotatably mounted on a fixed shaft 82 as shown in Fig. 9, and as previously indicated, each wheel 37 has a peripheral notch 38 with which the end 59 of an adjacent pawl 57 is engageable, see Figs. 5 and 6. The pawls 57 are swingably mounted upon a fixed pivot shaft 58 and are constantly urged to swing in clockwise directions as viewed in Figs. 5 and 6, by means of tension springs 82', so that when the several wheels 37 reach positions of zero setting, the pawl ends 59 will be forced into the corresponding notches 38 by these springs. When all of the numeral wheels 37 reach zero position of setting, all of the pawls 57 will be positioned as in Fig. 6, and the hooks 60 thereof will then release the lever 61 which will in turn release the latch 64, and consequently will allow the fluid pressure actuated bellows 69 to become effective in pushing the rod 67, cross-head 75, and the rod 72 longitudinally within the casing 33 in the direction indicated in Fig. 1. The tension springs 82' have their corresponding outer ends attached to a common oscillatory shaft 83, and this shaft is provided with local projections 84 which are engageable with extensions 85 on the pawls 57 when the shaft 53 is swung in a counter-clockwise direction from the position shown in Fig. 6 to that shown in Fig. 8. The end portion of the shaft 83 is provided with a bent oscillating lever 86 which is swingable outwardly of the casing 33 from the position shown in Fig. 7 to the position shown in Fig. 8, when the cover plate 79 is removed, by means of another spring 87, and when the lever 86 is thus released and displaced, the shaft projections 84 engage the extensions 85 and automatically become effective to lift all of the pawls 57 out of the notches 38, thereby releasing the numeral wheels 37 for resetting so far as the latches 57 are concerned.

The wheels 37 are not however freely rotatable relative to each other because of the interconnecting pinions 81, and in order to permit these pinions 81 to be disengaged from one of the adjacent wheels 37, the wheels 37 are mounted to slide on the shaft 39 and the pinions 81 are likewise mounted to slide on the shaft 82; and each pinion 81 is provided with a collar 88 which interlocks with a groove 89 in the adjacent wheel 37 as shown in Fig. 9. A hook 90 swingably suspended from a fixed pivot 91, as shown in Figs. 7, 8 and 9, is adapted to be swung inwardly around the shaft 39 at the end of the counter 36, in order to retain the pinions 81 in driving coaction with both of the adjacent numeral wheels 37, and the hook 90 is normally held in this position as shown in Fig. 7, by the cover plate 79. When the hook 90 is released and swung outwardly as in Fig. 8, the numeral wheels 37 may be spread apart sufficiently to disengage the pinions 81 from the numeral wheels at the right side thereof, thereby permitting free and unobstructed rotation and resetting of the individual numeral wheels 37. The shafts 39, 58, 82, 83 and the pivot 91 are all mounted in a common removable frame 92, thereby making the counter 36 readily removable from within the casing 33.

The releasing lever 61 which is normally held in active position as illustrated in Figs. 2 and 5, by the counter controlled pawls 57, is freely swingable within the casing 33 laterally of the bellows 51 as shown in Figs. 2, 3, 5 and 6, and extends through a slot 93 in the guiding partition 68. The pivot shaft 62 of the lever 61 is mounted in a bracket 94 in which the pivot pin 65 of the latch 64 is also mounted, and when the lever 61 is being held by the pawls 57 the cam 63 will hold the latch 64 in the active position as shown in Fig. 2 with the abutment 66 in engagement with the rod shoulder 71. However, when the lever 61 is released from the pawls 57 as when the counter wheels 37 attain zero position, the bellows 69 immediately expands and becomes effective to first throw the lever 61 to the position shown in Fig. 3 and to thereby release the latch 64 and thereafter move the rods 67, 72 longitudinally within the casing 33. This longitudinal movement of the rod 72 is utilized in a manner which will be subsequently explained, and it will be noted that the rod 72 is made up of alined endwise abutting sections forming a continuous rod extending throughout the length of the sections 25, 28 and partially along the plugging sections 29 or 30.

While the indicating section 25 may be used alone, it would ordinarily be utilized in conjunction with other detachable sections 28, 29 or 30. The construction of the guiding section 28 is shown in detail in Figs. 11 to 14 inclusive, and this section 28 comprises in general a tubular casing 95 which is attachable to the end of the casing 33 by means of the screw threads 35, an which has an end head 96 and a partition 97 through which a section of the rod 72 extends; a closure member 98 secured to the casing 95 remote from the head 96 and also coacting with the movable rod 72, the member 98 having an annular ledge 99; a bellows 100 secured to the member 98 and being expansible by fluid under pressure admitted thereto through a duct 101, the bellows 100 having a tapered end head 102 provided with a central guiding projection 103; another tubular casing 104 coacting with the member ledge 99 and having therein a bracket 105, a partition 106 and an end head 107 all of which are pierced by sections of the rod 72; a cross-head 108 rigidly attached to the section 72' of the rod 72 and having a set of three parallel latch pins 109 penetrating and slidable within the member 98 when the rod 72 is shifted longitudinally; a set of three similar releasable hooks 31 mounted upon the bracket 105 by means of pivot pins 110, and each having a triangular head 111 at one end cooperable with the tapered head 102 of the bellows 100 and with the latch pins 109, and also having a hooked end 112 at its opposite end engageable with an abutment 113 on the member 98 to lock the casing 104 to this member 98; a set of three bell-cranks 114 mounted in the partition 97 by means of pivot pins 115 and having inwardly extending arms coacting with a block 116; guide rollers 117 carried by arms 118 each of which is adjustably secured to one of the bell-cranks 114 by means of a clamping screw 119 coacting with a slot 120 in the arm 118; and another bellows 121 carried by the head 96 and expansible by fluid under pressure admitted thereto through a duct 122 and having an adjustable universal end element 123 coacting with a socket 124 in the block 116.

The closure member 98 is rigidly attached to the tubular casing 95 which is detachably but firmly secured to the indicating section casing 33 by means of the screw threads 35, and the auxiliary casing 104 which is held centrally of the casing 95 by the shoulder 99, is normally firmly attached to the member 98 by the three hooks 31, the hooked ends 112 of which coact with the ledge 113 as shown in Fig. 11. However, when the actuating rod 72 is shifted longitudinally as by the trip mechanism associated with the counter 36, to a position such as shown in Fig. 12, the latch pins 109 will release the triangular end heads 111 of the hooks 31, and the fluid under pressure acting upon the bellows 100 will immediately become effective to force the tapered head forwardly, thereby spreading the triangular ends 111 and moving the hooked ends 112 out of engagement with the shoulder 113 of the member 98. With the hooks 31 thus released, the section 28 may be withdrawn from the plugging section 29, 30, or vice versa, and in order to insure simultaneous release of all of the hooks 31, the projection 103 of the tapered head 102 is preferably guided in a central bore in the partition 106. The guiding rollers 117 are swingable outwardly through slots in the casing 95, and are cooperable with pipes or conduits 32 of different internal diameters as shown in dot-and-dash lines in Fig. 11. When these rollers 117 cooperate with larger pipes, the screws 119 and slots 120 are utilized to lengthen the roller carrier arms, and the clamping screws 119 serve to lock these arms in various positions of adjustment. While only one set of three guide rollers 117 has been shown, it may be desirable to furnish additional sets of these rollers, and this may readily be done by lengthening the casing section 95 and by inserting therein additional sets of rollers 117 and actuating bellows 121 therefor. The bellows 121 will obviously urge all of the rollers 117 outwardly, simultaneously and with equal pressure, and by virtue of the fact that there are three equally spaced rollers 117 in each set, the casing 95 and the other casings which are alined therewith will be accurately centered within the conduit 32.

When it is desired to locate a plug, or to perform some other operation within a conduit 32, at a definite predetermined location, one of the plugging sections 29, 30 may be attached to the guiding section 28 with the aid of the releasable hooks 31. In the plugging section 29 shown in detail in Figs. 15 to 18 inclusive, the assemblage comprises a tubular casing 125 which is detachably but firmly attached at one end to the end of the tubular casing 104 adjacent to the end head 107 by means of screw threads 126 or otherwise, and another tubular casing 127 is likewise detachably secured to the opposite end of the casing 125 by means of screw threads 128. The locking casing 125 is provided with internal opposite end heads 129, 130 and with an intervening bracket 131, and the plug casing 127 is also provided with internal opposite end heads 132, 133 and with a medial partition 134; and the rod 72 extends through the casings 125, 127 and is guided for longitudinal movement in the heads 129, 130, 132, 133, and in the bracket 131 and partition 134. A set of three locking cams 135 each swingably suspended from the bracket 131 by means of a pivot pin 136, is associated with the casing 125; and each of the cams 135 is swingable outwardly through a slot in the casing 125 and has an outer cam surface 137 adapted to grip the interior of the conduit 32, and also has an inner end 138 which is normally held in contact with an adjacent abutment 139 on the bracket 131, by a tension spring 140. A bellows 141 carried by the end head 129 is adapted to be supplied with expansible fluid under pressure through a duct 142, and the movable end of the bellows 141 carries an adjustable universal connector 143 which coacts with a socket formed in a block 144. The block 144 is disposed within a central recess 145 in the bracket 131, and while this block is engageable with the cam ends 138 when the bellows 141 is released; such engagement is normally prevented when the counter 36 is operating, by a pin 146 slidably confined in the bracket 131 and coacting with the block 144 and with one arm of a trip lever 147 pivotally suspended from the bracket 131 by a pin 148. The other arm 149 of the trip lever is bifurcated and normally abuts the side of a section 72'' of the trip rod 72, as in Fig. 15, and this rod section 72'' has a reduced portion 150 which is movable to a position such as shown in Fig. 16 wherein the bellows 141 will become effective to push the block 144 and pin 146 forward, to swing the lever 147 across the reduced portion 150, and to swing the cams 135 outwardly with their surfaces 137 in gripping contact with the interior of the conduit 32. This shifting of the cams 135 to locking position, obviously takes place whenever the numeral wheels 37 of the counter 36 attain zero position and release the trip lever 61. When the device is used in conduits 32 of larger diameter, the cams 135 should be replaced by longer ones.

The plug carrying casing 127 of the plugging and locking section 29, which is attached to the end of the locking casing 125, has a plug ring 151 adjustably secured to the end thereof remote from the casing 125, by means of screw threads 152, and an expansible sealing ring 153 is confined in an annular groove 154 in the ring 151. A contractible bellows 155 disposed within the casing 127 is normally completely filled with suitable liquid, and has one end secured to the end head 133 while its opposite end is provided with a closure 156 having a projection 157 slidable in a bore in the partition 134. Another bellows 158 which is elongatable by expansible fluid under pressure which may be admitted thereto through a duct 159, is also confined centrally within the casing 127 and has one end secured to the end head 132 while its opposite end has a closure 160 provided with a projection 161 adjustably attached to the projection 157 by means of a stud 162. The connection between the bellows 155, 158 is such that when liquid is permitted to escape from the bellows 155, the fluid under pressure confined within the bellows 157 will immediately become effective to expand the latter and will thus constantly contract the former and force liquid therefrom. The fixed end of the bellows 155 is provided with a liquid escape port 163 leading to an oscillatory valve 164 mounted in the end head 133 and having therein a port 165. The valve 164 has an actuating stem 166 the swinging end of which coacts with a notch 167 in the longitudinally movable sectional rod 72, and the valve port 165 is communicable with the port 163 and with another port 168 leading to the sealing ring 153, when the rod 72 is shifted by release of the latch mechanism associated with the counter 36. The bellows 155 may either be filled with liquid before installation thereof, or it may be refilled through a duct 169. Normally the liquid will be confined within this bellows 155 as shown in Fig. 15, but when the counter mechanism is tripped to shift the rod 72 longitudinally, liquid from the bellows 155 will be delivered into the elastic sealing ring 153 and will expand this ring into sealing contact with the interior of the conduit 32. The diameters of the rings 151, 153 will of course depend upon the internal diameter of the pipe or conduit 32 which is to be plugged, and after the sealing ring 153 and cams 135 have been properly positioned and locked in place, the sections 25, 28 of the assemblage may be withdrawn and concrete or other plugging material may be poured into the conduit above the seal ring 153.

In place of a plugging section 29 such as shown in Figs. 15 to 19 inclusive, a relatively standard plugging section 30 such as shown in Figs. 20 and 21 may be utilized. This modified plugging attachment comprises a locking section which may be the same as that shown in Figs. 15, 16 and 18, but the plug portion of which is attached to the end of the locking section, consists of a flexible sealing cup 170 of any selected size adapted to contact the interior of the conduit 32 and secured to the end of the casing 125 adjacent to the end head 130 by means of a stem 171. The stem 171 is disposed coaxial with the casing 125 and has one end 172 rigidly attached to the casing 125 and end head 130 in any suitable manner, this stem end 172 being pierced by the longitudinally shiftable rod 72. The opposite end of the stem 171 may be extended centrally through the cup 170 and firmly attached to an end disk 173. The cup 170 may be snugly confined between a clamping ring 174 and another disk 175, and a buffer block 176 formed of wood or the like may be clamped between the disks 173, 175. The specific construction of this plug is of relatively slight importance, and may be varied considerably, and the modified plug may obviously be positioned at a definite place within a conduit 32 and locked therein, with the aid of the cams 135 when tripped by the counter 36.

While the normal use and operation of my improved measuring device should be apparent from the foregoing description, the same will again be generally and briefly described. When utilizing the device for merely the purpose of measuring lineal length or depth of a conduit 32, the plugging sections 29, 30 need not be used, and the subtraction counter 36 specifically shown in the drawings may then be replaced by an ordinary addition counter of well-known construction. It is preferable during such use, to utilize both the indicating section 25 and the guide section 28, and as the travelling member advances along the interior of the conduit which is to be measured, the rollers 117 will centralize and guide the member while the roller 40 will actuate the counter 36. When the travelling member comprising the sections 25, 28 is active in measuring, the pawl 77 will engage the ratchet wheel 78 and will drive the counter wheels 37; but when the member is being withdrawn from the casing or conduit 32 the pawl 77 will ride over the teeth of the ratchet wheel 78 and the counter reading will thus remain undisturbed.

When utilizing the improved apparatus to position a plug at a definite location within the conduit 32, it is preferable to utilize a special subtraction counter 36 such as herein described, and the travelling member will then preferably consist of three interconnected and alined sections 25, 28 and 29 or 30. The counter wheels 37 should then be initially set to indicate the depth at which the plug is to be located, and the pawls 57 should be set to engage the lever 61 as in Fig. 2, whereupon the latch 64 will hold the sectional rod 72 in elevated position and this rod will maintain the hooks 31 and the locking cams 135 in the positions shown in Figs. 11, 15 and 20. A plug, either of the type shown in Fig. 15 or of the type shown in Fig. 20, may be utilized, but the action of the plug of Fig. 15 will be specifically described. The travelling member may then be lowered within a conduit 32 by means of a rod or cable 27 as illustrated in Fig. 19, whereupon the rollers 117 will guide and centralize the assemblage, while the roller 40 will constantly engage and roll along the conduit interior, and will operate the counter wheels 37. When all of these wheels 37 reach positions of zero setting, the travelling member will have reached the desired predetermined depth, and the pawls 57 will release the lever 61. Release of this lever 61, causes the bellows 69 to expand and move the rod 72 longitudinally within the sections 25, 28, 29, thereby causing the bellows 141 to swing the cams 135 into locking position, and also causing the valve 164 to release liquid under pressure from the bellows 155 into the sealing rings 153, as shown in Figs. 16 and 17.

The movement of the rod 72, also permits the bellows 108 to become effective in disengaging the hooks 81, thereby permitting the upper sections 25, 28 to be freely withdrawn from within the conduit 32, while the plugging section 29 remains firmly locked at the exact predetermined location. The apparatus can with slight change and adjustment, be caused to effectively cooperate with conduits 32 of various diameters, disposed either vertical or otherwise, and when the sections 25, 28 are withdrawn from the conduit 32, the pawl 77 and ratchet wheel 78 will again function as hereinabove described, to prevent reverse rotation of the counter wheels 37.

From the foregoing detailed description it will be apparent that my present invention comprises a simple, compact and highly efficient unit which may be utilized to either accurately measure the length of a conduit, or to find a definite location within a conduit. The lineal measuring wheel is rotated by direct contact with the inner wall of the conduit, and this feature is important since it permits most accurate measurement of the conduit length. The use of a subtracting counter for finding a definite location within a conduit, by virtue of the fact that such counter may be initially set to the desired depth and trips when reaching zero setting, is also of importance since it permits extremely accurate positioning of plugs, casing perforators, or the like. The trigger release mechanism, which is actuated by the counter when it reaches a predetermined location, is quick and positive in action, and the improved counter can be readily set to accurately predetermine any desired depth. While I have described the use of air or gas filled bellows for actuating the several mechanisms associated with the travelling member, these may be replaced by springs or other actuating means. The bellows, however, can be readily refilled with elastic fluid when necessary, and the seal expanding bellows associated with the plug ring may also be readily filled with liquid. As previously indicated, any number of sets of guide rollers 40 may be utilized, and the arresting cams 135 are positive in their action and will positively stop the movement of the travelling unit immediately upon attainment of the predetermined depth. The unit is furthermore of extreme flexibility by virtue of the fact that the section 25 may be used either alone, or in conjunction with the section 28, or in conjunction with both a section 28 and a section 29, 30. Because of the fact that the sections 25, 28 may be readily withdrawn after a plugging section has been located within a conduit 32, the indicating and guiding sections may be subsequently utilized. The improved measuring unit can be utilized either for the purpose of locating a plug at a definite point within a well, or for accurately placing a perforating gun, or for any other purposes, and by associating the counter directly with the travelling member, inaccuracies due to stretching of the cable or the like, are obviated. The entire assemblage is readily manipulable to perform the various functions above indicated, and is extremely accurate in obtaining the desired results. While the improved device has been described herein as being especially applicable to oil wells, it can be used advantageously for other purposes; and it is to be noted that the last section comprising the casing 127 and the sealing elements and mechanism associated therewith, can be disconnected from the casing 125 and used alone.

It should be understood that it is not desired to limit the invention to the exact details of construction or to the precise mode of use herein shown and described, for various modifications within the scope of the claims may occur to persons skilled in the art.

I claim:

1. A conduit measuring device comprising, a sectional member formed to be lowered down an approximately upright conduit, a counter carried by one section of said member, means constantly engaging the conduit wall to operate said counter, a plug for the conduit carried by another section of said member, and means operable by said counter when said member reaches a predetermined depth for simultaneously positively stopping said plug section and releasing said counter section therefrom, whereby said counter may be removed while said plug remains at any exact predetermined location.

2. A conduit measuring device comprising, a sectional member formed to advance along a conduit, a subtraction counter carried by one section of said member, means constantly cooperable with the wall of said conduit for gradually reducing the indication afforded by said counter, a plug for the conduit carried by another section of said member, and means operable by said counter when zero indication is reached for simultaneously positively stopping the travel of said plug at any exact predetermined location and disconnecting said counter therefrom.

3. A conduit measuring device comprising, a member movable along the interior of a conduit, a subtraction counter carried by said member and having a plurality of independently resettable numeral wheels, means constantly cooperable with the interior of said conduit for reducing the count afforded by said wheels, a plug carried by said member, and means operable when all of said counter wheels reach zero position for simultaneously positively stopping the movement of said plug at any exact predetermined location and disconnecting said counter therefrom by separation of said member into sections.

4. A conduit measuring device comprising, a sectional member movable along a conduit, a counter carried by one section of said member, and means operable by said counter for automatically positively locating and disconnecting another section of said member from the counter carrying section at zero reading of the counter, whereby the counter carrying section is freely removable while the disconnected section remains at the exact predetermined location.

5. A conduit measuring device comprising, a sectional member movable along a conduit, a counter carried by one section of said member, means operable by said counter for automatically definitely positioning and disconnecting another section of said member from the counter carrying section at zero reading of the counter, and means for positively locking the disconnected section within the conduit at the exact predetermined position while permitting free withdrawal of the counter.

6. A conduit measuring device comprising, a member having separable indicating and plugging sections, a counter carried by said indicating section, a seal and a lock carried by said plugging section, and means operable by said counter at zero reading for actuating said lock and for disconnecting said sections when said seal reaches a predetermined location within a conduit whereby said counter is freely removable while said plugging section remains within the conduit.

7. A conduit measuring device comprising, a separable section member, a counter carried by one section of said member and being operable by the movement thereof along a conduit, a lock carried by another section of said member, and means operable by said counter for actuating said lock to positively prevent displacement of the seal along the conduit in either direction and for separating said sections when said member reaches a predetermined position within the conduit as definitely determined by counter indication.

8. A conduit measuring device comprising, a separable section member, a counter carried by one section of said member, a seal carried by another section of said member, and means operable by said counter when said seal reaches a predetermined location within the conduit for separating said member sections and for locking said seal within the conduit at said location as accurately determined by counter reading.

9. A conduit measuring device comprising, a separable section member, a counter carried by one section of said member, a seal carried by another section of said member, and means operable by said counter for positively positioning said seal in any selected precise location within the conduit and for disconnecting said sections when said member reaches a predetermined position within the conduit as accurately determined by counter readings.

10. A conduit measuring device comprising, separable sections simultaneously movable along a conduit, a counter carried by one of said sections, means for releasably connecting said sections, and trip mechanism operable by said counter for actuating said connecting means to disconnect said sections precisely at zero reading of the counter.

11. A conduit measuring device comprising, alined sections simultaneously movable along a conduit, a counter carried by one of said sections, a fluid pressure expansible seal carried by another of said sections, means for admitting fluid under pressure to said seal, trip mechanism operable by said counter to actuate said fluid admission means and to lock said seal within the conduit precisely at a preselected reading of the counter, and means for simultaneously disconnecting said sections when said fluid admission means is actuated.

12. A conduit measuring device comprising, separable sections simultaneously movable along a conduit, a counter carried by one of said sections, locking cams carried by another of said sections, an expansible seal carried by said other section, resilient means for actuating said cams and for forcing fluid under pressure into said seal to expand the same at a predetermined reading of the counter, and trip mechanism operable by said counter to release said resilient means and to thereby actuate said cams and expand said seal precisely when said counter reading is reached.

13. A conduit measuring device comprising, a plug movable along a conduit, a counter movable along the conduit with said plug, and means operable by said counter for positively locating said plug in a definite position within the conduit as accurately determined by pre-setting of the counter and for simultaneously releasing said counter for removal from the conduit.

14. A conduit measuring device comprising, a plug movable along a conduit, a subtraction counter movable along the conduit with said plug, and means operable by said counter for positively locating said plug in a definite position within the conduit as accurately determined by zero-reading of the counter and for simultaneously releasing said counter for removal from the conduit.

15. A conduit measuring device comprising, a conduit sealing plug movable along an approximately upright conduit, a counter connected to and movable along the conduit with said plug, and means operable by said counter for positively locking said sealing plug in a predetermined position within the conduit as accurately determined by presetting of the counter and for simultaneously releasing said counter for free removal from the conduit.

16. A conduit measuring device comprising, a sealing plug movable along an approximately upright conduit, a subtraction counter connected to and movable along the conduit with said plug, and means automatically operable by said counter when zero reading thereof is reached for positively locking said sealing plug exactly in a definite position within the conduit as accurately determined by pre-setting of the counter and for simultaneously detaching said counter from said plug for removal of the former from the conduit.

MARK M. HENNESSY.